US 6,701,885 B2

(12) United States Patent
Klomp et al.

(10) Patent No.: US 6,701,885 B2
(45) Date of Patent: Mar. 9, 2004

(54) ENGINE CONNECTING ROD MECHANISM FOR CYLINDER PRESSURE CONTROL

(75) Inventors: Edward Daniel Klomp, Clinton Township, Macomb County, MI (US); Marek Lejzorowicz, Milford, MI (US)

(73) Assignee: General Motors Corporation, Detroit, MI (US)

( * ) Notice: Subject to any disclaimer, the term of this patent is extended or adjusted under 35 U.S.C. 154(b) by 22 days.

(21) Appl. No.: 10/144,119

(22) Filed: May 13, 2002

(65) Prior Publication Data

US 2003/0209219 A1 Nov. 13, 2003

(51) Int. Cl.[7] .............................................. F02B 75/32
(52) U.S. Cl. .................................................... 123/197.4
(58) Field of Search ........................... 123/197.4, 197.3, 123/48 R, 48 B, 48 C, 78 R, 78 C, 78 E, 78 F, 78 BA

(56) References Cited

U.S. PATENT DOCUMENTS

| 4,254,743 A | * | 3/1981 | Reid et al. | ................. | 123/48 B |
| 5,165,368 A | | 11/1992 | Schechter | ................. | 123/48 B |
| 5,562,068 A | * | 10/1996 | Sugimoto et al. | ......... | 123/48 B |
| 5,960,750 A | | 10/1999 | Kreuter | .................... | 128/48 B |
| 6,450,136 B1 | * | 9/2002 | Klomp et al. | .............. | 123/78 E |

FOREIGN PATENT DOCUMENTS

EP          0184042          11/1985

* cited by examiner

Primary Examiner—Tony M. Argenbright
Assistant Examiner—Hyder Ali
(74) Attorney, Agent, or Firm—Kathryn A. Marra

(57) ABSTRACT

To provide peak cylinder pressure control, an eccentric bearing is biased toward a first angular position wherein an attached piston is raised to a maximum compression ratio position in the cylinder. The compression ratio may remain constant at lower loads and above until a predetermined force generated by cylinder pressure is reached. At this point, the force acting on the eccentric lever arm or eccentricity of the bearing overcomes the restraining biasing force, causing the eccentric bearing to rotate in the connecting rod to move the eccentric end of the rod outward, away from the cylinder. This motion effectively shortens the length of the connecting rod and moves the piston downward relative to a connected crankpin. In this manner, the effective compression ratio of the cylinder is temporarily reduced and the pressure developed in the cylinder is controlled by the mechanical mechanism.

9 Claims, 6 Drawing Sheets

ENGINE CONNECTING ROD MECHANISM FOR CYLINDER PRESSURE CONTROL

TECHNICAL FIELD

This invention relates to reciprocating piston internal combustion engines and more particularly to a mechanism for controlling maximum cylinder pressures in such engines.

BACKGROUND OF THE INVENTION

It is known in the art relating to reciprocating piston engines to provide means for limiting maximum cylinder pressures by allowing for some compressive adjustment of the position of the piston relative to its connecting rod. In one prior art arrangement, a preloaded compression spring is provided between the piston and its connecting rod attachment. In another, the piston is mounted on an oil pressure cushion which is connected with a relief valve to control the maximum oil pressure. In both cases, maximum engine cylinder pressure is limited by relative downward movement of the piston on the connecting rod when the maximum desired cylinder pressure is reached.

The provision of mechanisms to limit cylinder pressures can allow the use of higher compression ratios in the cylinder which provide improved efficiency when the engine is operated at lower and medium load conditions. At higher loads, the downward motion of the piston relative to the connecting rod operates to limit maximum cylinder pressures, reducing the rate of pressure rise and resulting in smoother and quieter engine operation without damage from the effects of the higher compression ratio provided in lower load operating conditions. Other mechanisms proposed have included eccentric connecting rod bearings or piston pins which are rotated or oscillated as the piston reciprocates to vary the effective connecting rod length. Means for adjusting the phase of oscillation allows control of maximum piston compression ratio. However the prior art methods for accomplishing these results are considered to excessively complicate piston and connecting rod design.

SUMMARY OF THE INVENTION

The present invention utilizes a sandwiched element in the form of an eccentric bearing rotatably mounting the connecting rod on a crankpin of the crankshaft or, alternatively on a wrist pin of the piston. If desired, eccentric bearings could be utilized in both the crankpin and wrist pin locations.

In carrying out the preferred embodiment, the eccentric bearing is mounted in the connecting rod with the center of the outer diameter that rotatably engages the connecting rod offset by a predetermined eccentricity from the inner diameter of the bearing, which engages the crankpin. The eccentricity defines an effective lever arm acting from the center of the connecting rod bore around the center of the crankpin bore.

When load is applied to the piston, the eccentricity tends to force the center of the connecting rod bore from a position longitudinally upward from a lateral axis of the crankpin relative to the connecting rod (a crankpin axis parallel to the lateral axis of the connecting rod bore) toward a position longitudinally downward from the relative lateral crankpin axis. This lowers the position of the piston in the cylinder and reduces the effective compression ratio. The amount of rotational force developed on the eccentric bearing is dependent both on the length and position of the eccentric lever arm as well as on the force applied against the lever arm by the engine cylinder pressures and other forces.

To provide pressure control, the eccentric bearing may be provided with an extending lever or cam which is biased toward a first angular position by a preloaded compression (or tension) spring. The spring rotates the bearing to a first position against a stop, with the connecting rod and attached piston raised to the highest compression ratio position in the cylinder. The compression ratio may remain constant at lower loads and above until a predetermined force generated by cylinder pressure is reached.

At this point, the force acting on the eccentric lever arm or eccentricity of the bearing overcomes the restraining force of the spring, causing the eccentric bearing to rotate in the connecting rod to move the eccentric end of the rod outward, away from the cylinder. This motion effectively shortens the length of the connecting rod and moves the piston downward relative to the connected crankpin. In this manner, the effective compression ratio of the cylinder is temporarily reduced and the pressure developed in the cylinder is controlled by the mechanical mechanism.

These and other features and advantages of the invention will be more fully understood from the following description of certain specific embodiments of the invention taken together with the accompanying drawings.

DESCRIPTION OF THE PREFERRED EMBODIMENT

Figure 1:
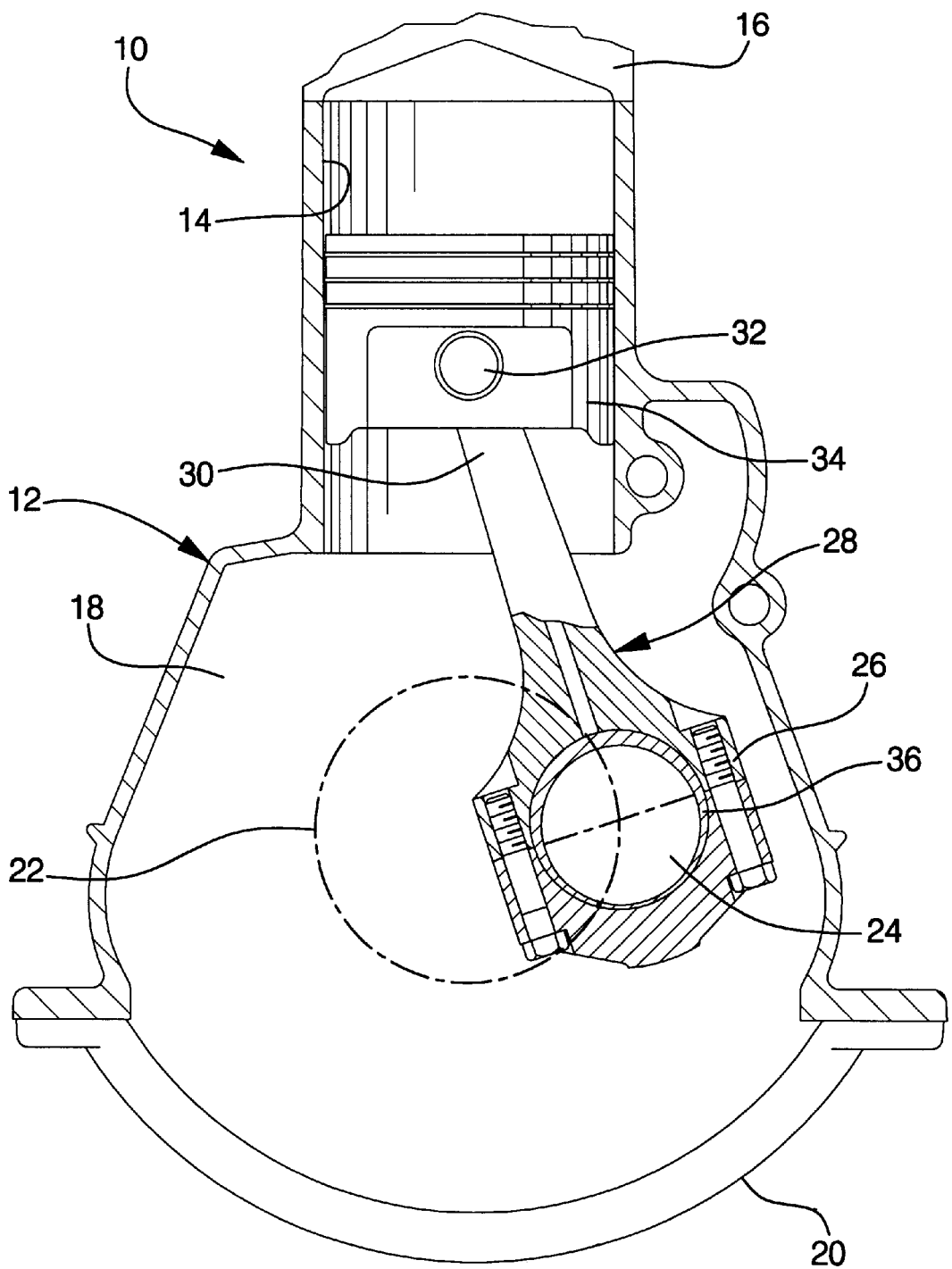
FIG. 1 is a transverse cross-sectional view through a simplified mechanism representing a single cylinder of an internal combustion engine according to the invention.

Referring first to FIG. 1 of the drawings in detail, numeral 10 generally indicates, in simplified form, an internal combustion engine including a cylinder block 12 internally defining a cylinder 14 closed at an upper end by a cylinder head 16. Below the cylinder 14 the cylinder block defines a crankcase 18 closed at the bottom by an oil pan 20. The cylinder block supports a longitudinally extending crankshaft 22 having at least one eccentric crankpin 24 journaling the lower end 26 of a connecting rod 28. An upper end 30 of the connecting rod carries a piston pin 32 which connects with a piston 34 reciprocably mounted in the cylinder 14.

Figures 2, 2A:
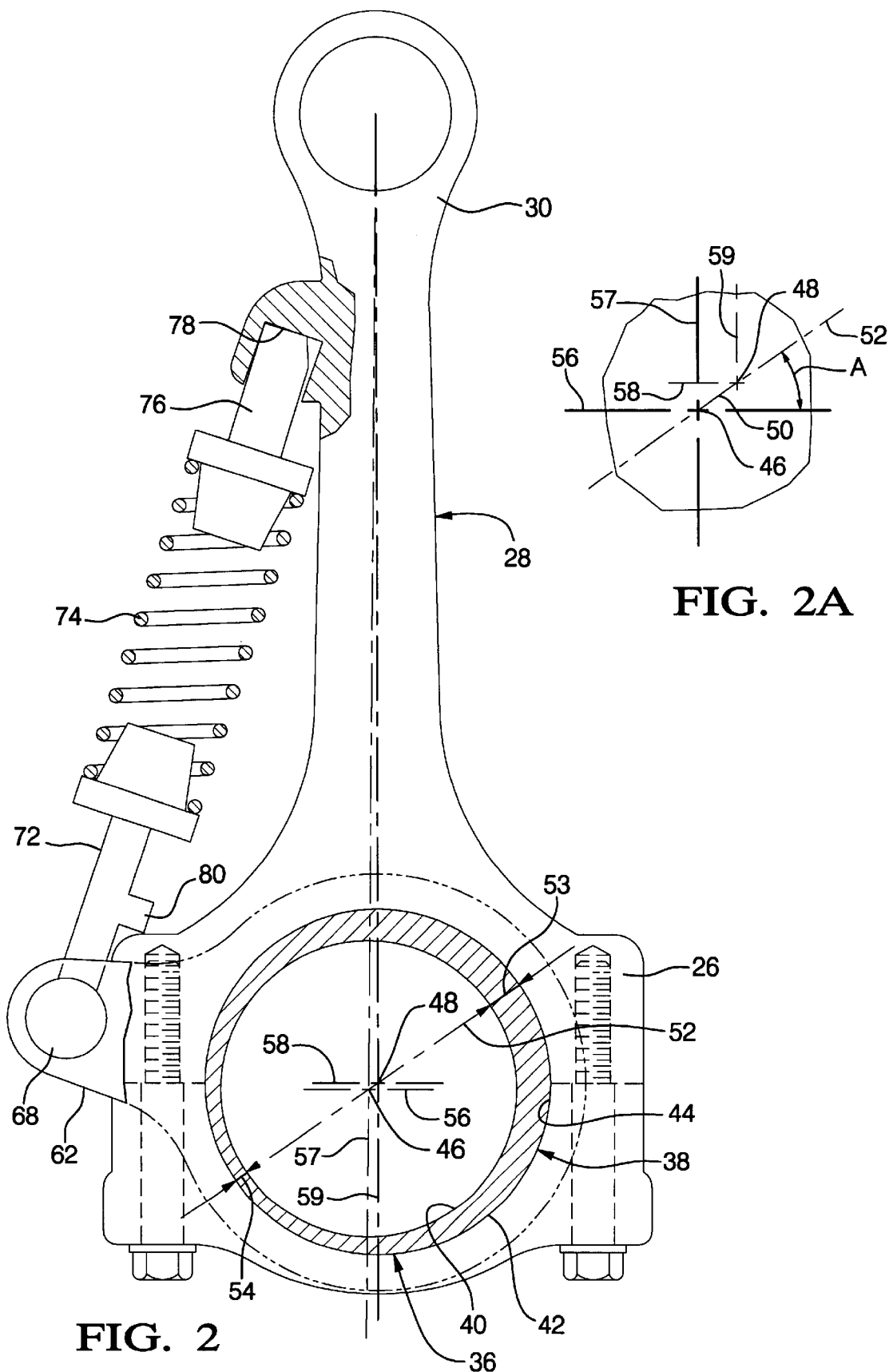
FIG. 2 is a cross-sectional end view of a connecting rod for the engine having an eccentric bearing orientated in a first angular position.
FIG. 2A is an enlarged view of the first angular position of eccentricity.
Figures 3, 3A:
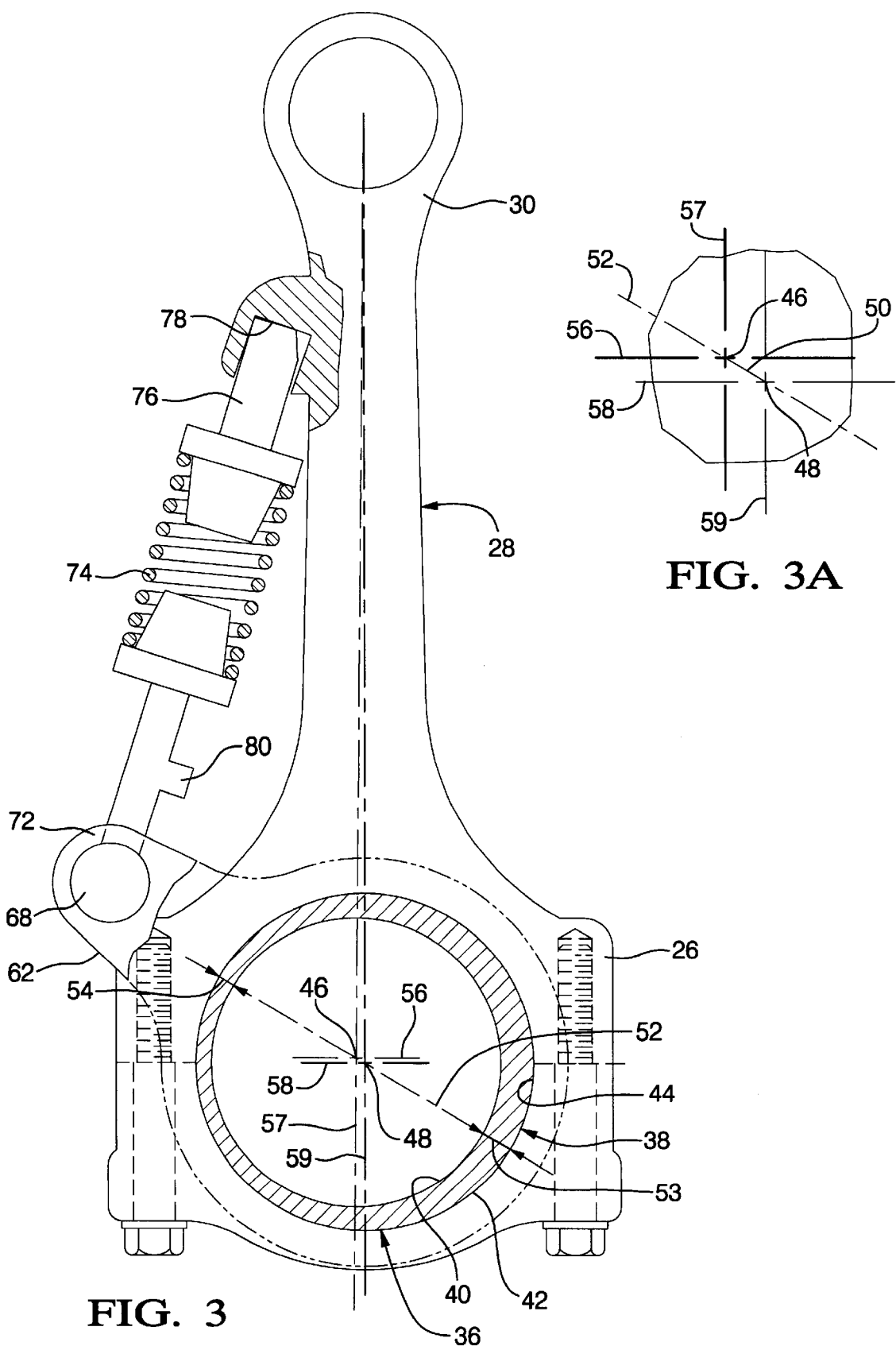
FIG. 3 is a view similar to FIG. 2 but having the eccentric bearing oriented in a second angular position representing a reduced compression ratio.
FIG. 3A is a view similar to FIG. 2A showing the second angular position of eccentricity.
Figure 4:
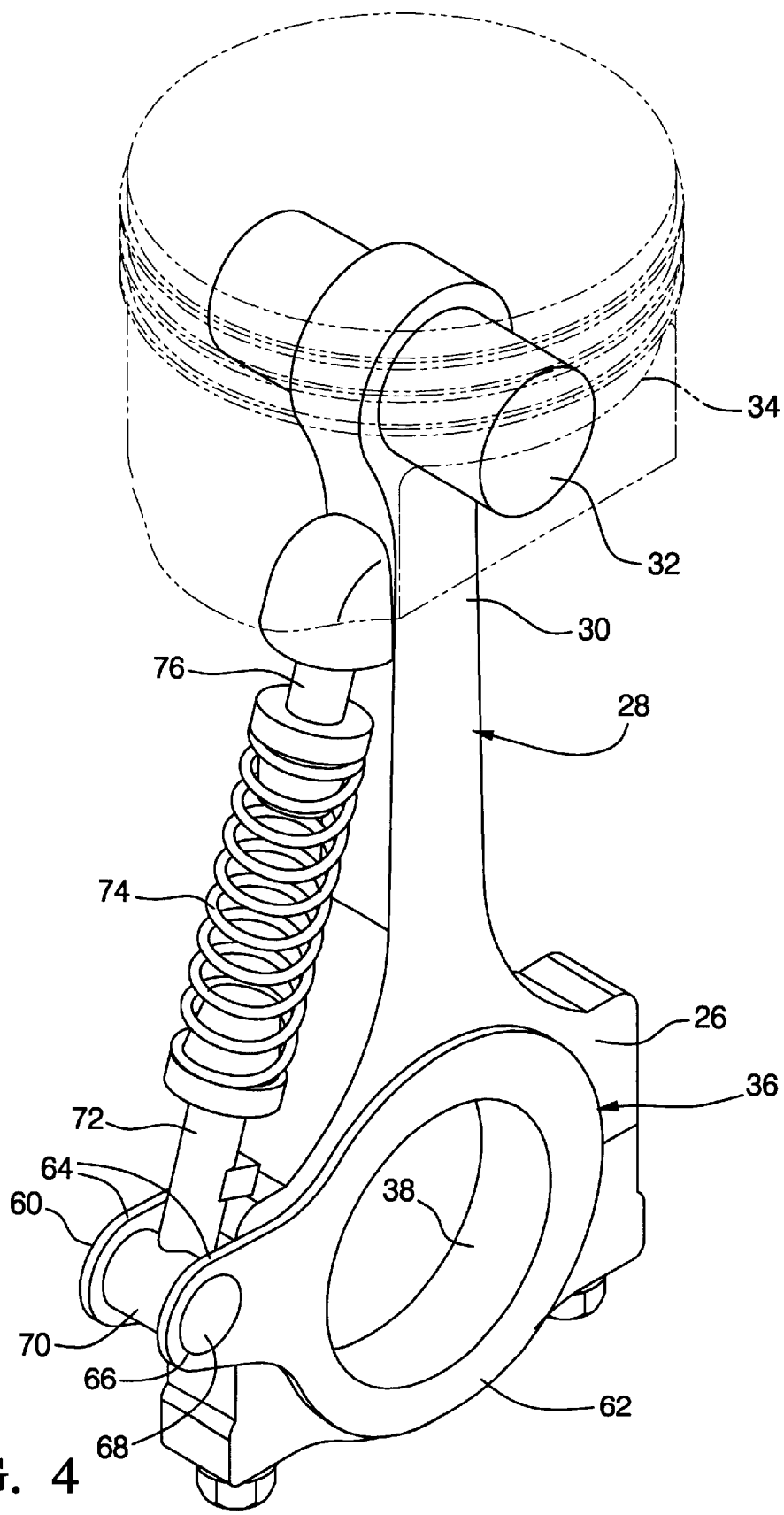
FIG. 4 is an isometric view illustrating a piston connecting rod and bearing assembly.

As is best shown in FIGS. 2–4, an eccentric bushing or bearing 36 is provided between the lower end 26 of the connecting rod 28 and the outer surface of the crankpin 24. Bearing 36 includes a central portion 38 having a cylindrical inner diameter 40 which engages the outer surface of the crankpin 24, not shown in FIGS. 2–4. The central portion 38 also includes a cylindrical outer diameter 42 which engages a longitudinal bore 44 formed in the lower end 26 of the connecting rod. The crankpin 24 is conventionally rotatable within the bearing inner diameter 40 and the bearing outer diameter 42 is also rotatable within the bore 44 of the connecting rod.

As is best shown in the enlarged views of FIGS. 2A and 3A, the inner diameter 40 of the bearing is centered on a longitudinal axis 46 which is colinear with the axis of the crankpin 24. The outer diameter of the bearing is centered on a separate longitudinal axis 48 which is colinear with the axis of the bore 44 of the connecting rod lower end. In accordance with the invention, the axis 48 of the outer diameter is eccentrically displaced from the axis 46 of the inner diameter by a distance or eccentricity 50 extending along a common plane 52 which passes through both axes 46, 48 and through the bearing wall at opposite points 53, 54 of maximum and minimum thickness. Thus, the eccentricity 50 effectively acts as a lever arm of the corresponding axis 48 of the connecting rod acting around the corresponding axis 46 of the crankpin.

As installed in the engine, this thick wall portion 53 of the bearing is positioned initially above and substantially to one side laterally of the lateral and longitudinal axes 56, 57 of the crankpin 24 which are parallel to the corresponding axes 58, 59 of the connecting rod bore 44. Thus, the lever arm 50 could extend at an angle A of, for example, 25° longitudinally upward or counterclockwise from the lateral axis 56 in the initial or first position of the bearing as shown in FIGS. 2 and 2A. The actual angle of the lever arm 50 for a particular application would depend upon many factors and might vary within a range from about 75° longitudinally upward or counterclockwise from the lateral axis 56 to about coextensive with, or at 0° from, the lateral axis 56.

The lateral displacement of the lever arm 50 converts the downward force of combustion pressure acting on the piston and connecting rod to a torque acting to rotate the bearing 36 in a clockwise direction as shown in the figures. The possible rotation is from an initial position as shown in FIGS. 2 and 2A toward a second or final position as shown in FIGS. 3 and 3A wherein the eccentric lever arm is rotated clockwise around the crankpin center 46 to an angle B of about 25° longitudinally downward, or clockwise from, the lateral axis 56 of the crankpin parallel with the axis 58 of the corresponding connecting rod bore 44. Again, this second position could, depending on the application, have a range of from essentially colinear with the lateral coordinate to an angle of up to about 75° downward or clockwise from the lateral axis 56.

The eccentric bearing 36 includes, in addition to the central portion 38 with its eccentric diameters, front and rear flanges 60, 62, shown in FIG. 4, which maintain the bearing within the connecting rod bore. The flanges also include radially extending levers 64. The levers include bores 66 carrying a longitudinal pin 68 on which a pivotable bushing 70 is mounted. Bushing 70 connects with a lower spring seat 72 on which a compression spring 74 is seated. The spring is compressed against an upper spring seat 76 mounted in a recess 78 on the side of the connecting rod 28. The spring 74 exerts a predetermined force against the spring seats which generates torque urging the eccentric bearing 36 in a counterclockwise direction as shown in the drawings to normally force the bearing to its initial or first position, shown in FIG. 2, wherein a stop 80 extending from the lower spring seat 72 engages a portion of the connecting rod lower end 26 to prevent further counterclockwise rotation of the bearing past its intended initial position.

In operation of the engine in which connecting rods 28 are utilized, combustion in the cylinder 14 causes a downward force on the piston which is transferred through the connecting rod 28 to the crankpin 24. There, the force is converted in part by the eccentric lever arm 50 to a torque acting to urge the eccentric bearing 36 in a clockwise direction from its initial position of FIG. 2. However, the force of the compression spring 74 is selected to overcome the rotational torque on the bearing at low and medium engine loads so that the initial compression ratio of the piston is maintained and efficient combustion and operation of the engine is provided.

As the engine load increases, however, maximum cylinder pressures also increase to a point where the torque caused by the force of cylinder pressures exceeds the restraining force of the spring. Then, the cylinder pressures cause some rotation of the bearing in a clockwise direction, toward and possibly up to the full amount allowed, to the second position shown in FIG. 3 where the bearing has been fully rotated to a predetermined position established by a stop, such as by engagement of the spring seats 72, 76. The resulting clockwise-rotation of the bearing causes the center of the connecting rod bore 44 to move downward relative to the center of the crankpin 24, thus effectively shortening the length of the connecting rod and increasing top dead center clearance of the piston from the cylinder head.

The result is a self actuated reduction in the effective compression ratio which limits the cylinder pressure to a desired maximum value while allowing operation at lower loads with an increased compression ratio above that which would be possible without a control on cylinder pressures as provided by the invention. It should be understood that when the peak pressure has been reduced, the spring 74 will return the eccentric bearing 36 to its initial position each cycle, so that a full expansion of the combustion gases and operation on the maximum permitted compression ratio will be obtained each engine cycle.

Figure 5:
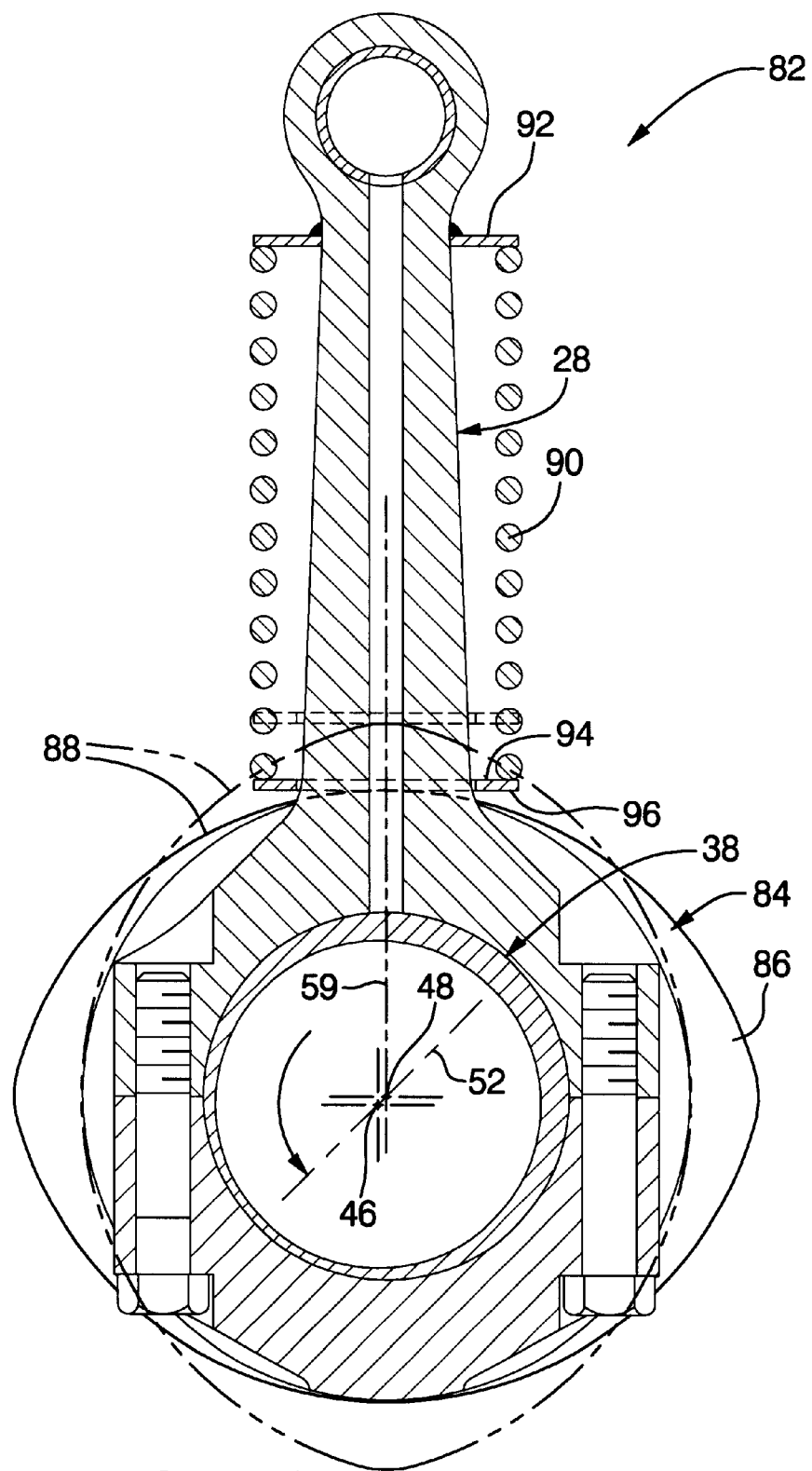
FIG. 5 is a cross-sectional end view of an alternative embodiment of connecting rod with an eccentric bearing according to the invention.

Referring now to FIG. 5, wherein like numerals indicate like or corresponding components to those of the first described embodiment, numeral 82 generally indicates a connecting rod assembly according to the invention including a connecting rod 28 having an eccentric bearing 84 which includes an eccentric central portion 38 connected with flanges 86 which are formed with peripheral cam surfaces 88. A coil compression spring 90 is positioned around the shank of the connecting rod 28 and engages an upper spring retainer 92 fixed to the rod inward of the piston pin end. A second spring retainer 94 is engaged by the spring and includes a lower surface 96 which engages the cam surfaces 88 of the flanges 86.

In operation in an engine, the central portion 38 of the bearing 84 could be positioned in approximately the same angular initial and final positions as described with respect to the embodiment of FIGS. 1–4. With an intended angular travel of 50°, for example, the cam will then be positioned as shown in FIG. 5 with the compression spring urging the cam and attached bearing in a counterclockwise direction against a stop, not shown, to establish the initial position of the bearing.

When peak combustion gas pressures become sufficiently high, the force exerted by these pressures will cause the bearing 84 to rotate clockwise, as described regarding the first embodiment, rotating the cam surfaces to compress the coil spring 90 until, at a maximum pressure, the spring will be compressed to a second position wherein the cam is rotated about 50° from its initial position acting against a stop, not shown. This action will, as in the case of the earlier described embodiment, cause a reduction of compression ratio and a limiting of cylinder pressures so that normal operation at lower and medium loads with a higher compression ratio is made possible.

Upon the reduction of the compression pressures during the down stroke, the cam will again be returned to its initial position, restoring the connecting rod to its initial effective length and returning the system to normal operation until the next excessive peak pressure occurs.

It should be understood that in relation to both of the described embodiments, the angles of rotation of the bearing may be varied over a wide range depending upon the various forces including combustion pressures and inertias of the mechanism which may be involved. For the embodiment of FIGS. 2–4, the initial (first angular) position of the bearing, the connecting rod eccentricity might reasonably be practical within a range of from about 75 to 0 degrees longitudinally upward from the relative lateral crankpin axis (parallel with the lateral axis of the connecting rod bore). Correspondingly, the maximum displaced position of the bearing could reasonably extend from about 0 to 75 degrees downward from the relative lateral crankpin axis. The embodiment of FIG. 5 might support varying ranges.

Figure 6:
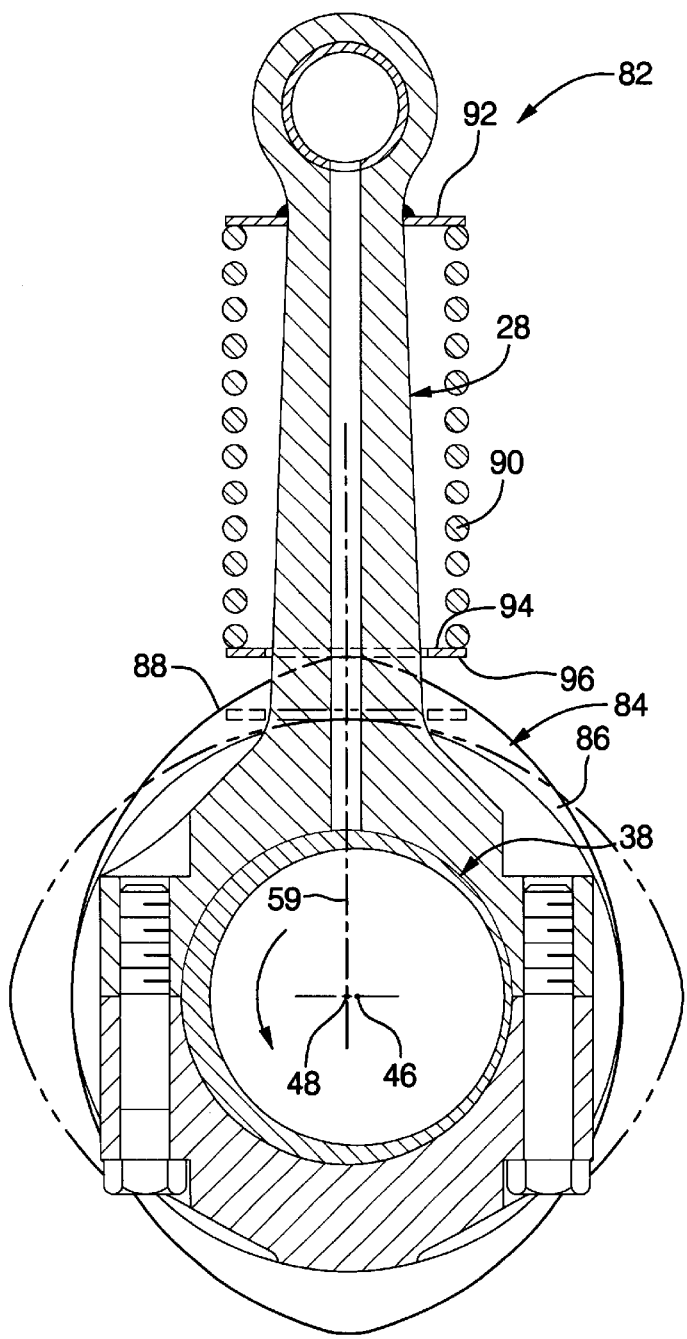
FIG. 6 is a view similar to FIG. 5 but showing an alternative operational mode of the FIG. 5 embodiment.
Figure 7:
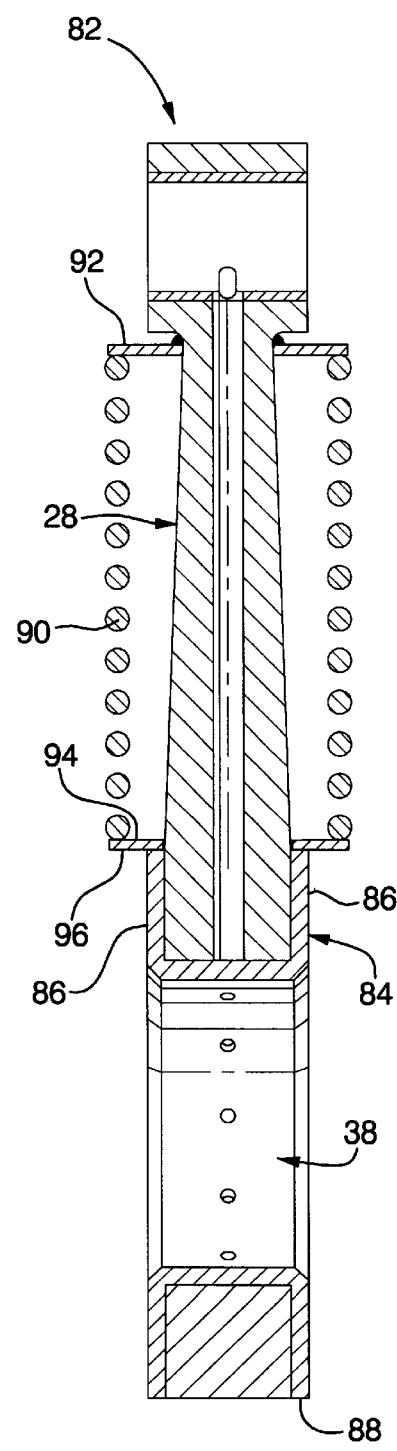
FIG. 7 is a longitudinal cross sectional view through the connecting rod and bearing in the initial position of FIG. 6

FIGS. 6 and 7 illustrate an alternative operational concept for the embodiment of FIG. 5. The eccentric bearing 84 is shown in an initial position at 0° downward from (coextensive with) the relative lateral crankpin axis and the cam surfaces 88 are positioned at the lowest lift position (smallest diameter) engaging the spring bearing surfaces 96. In this position, the effective lever arm force is at a maximum while the restraining force of the cams is essentially zero except for friction of the eccentric bearing 84 in its central portion 38 and at the cam surfaces 88. A relatively low but increasing cylinder pressure will thus begin counterclockwise rotation of the bearing 84 eccentricity (at the axis 48 of the outer diameter) downward toward its lowest point below the axis 46 of the crankpin.

As the bearing rotates, the effective lever arm becomes smaller while gas pressures become larger. If angular rotation of the bearing results in sufficient inertia, the bearing may reach the lowest point where the pointed ends of the cam surfaces 88 are centered against the bearing surface 96 of the lower spring retainer 92. There, piston compression ratio reaches its lowest value and the spring return force is greatest but the lever arm is aligned with the longitudinal axis 59 of the connecting rod so there is no resulting force to rotate the bearing in either direction.

Here it is conjectured that the bearing will most likely not reach the lowest eccentric point or, if it does, will be carried past it by rotational inertia or by operational forces on the connecting rod 28 and the bearing 84. In either case, the spring 90 will act upon the cam surfaces 88 to return the bearing 84 toward its higher positions as gas pressure is reduced, until the lowest position of the cam is reached in either direction of cam rotation. This mode of operation could be helpful in evening out wear on the cams as well as increasing the potential eccentric travel of the bearing and the resulting variation in compression ratio of the engine piston in its cylinder.

It should be apparent however that the described embodiments, as well as obvious alternatives thereof, may be utilized to provide a limiting of combustion pressures in an engine cylinder by effectively reducing the compression ratio when the combustion pressure becomes excessive. The mechanism has the advantage of being controlled completely by the actual compression pressures themselves rather than by a position modifying means. Thus the invention provides a simplified compression ratio or pressure control mechanism which can be applied in extending the operating range and compression ratios of internal combustion engines.

The foregoing illustrations have been limited to exemplary embodiments wherein an eccentric bearing is provided at the crankpin end of a connecting rod. It should be appreciated, however, that similar results could be obtained by the use of a rotatable eccentric bushing located at the piston pin end of a connecting rod. When combined with a suitable spring arrangement allowing reduction of the compression ratio at high peak pressures, the operation would be similar to that previously described.

As used in the claims, the phrase "a lateral (or longitudinal) axis of the crankpin relative to the connecting rod" refers, for example as shown in FIGS. 2A and 2B, to a lateral axis 56 of the crankpin which is parallel with a corresponding lateral axis 58 of the connecting rod bore 44 (or to a longitudinal axis 57 of the crankpin which is parallel to a corresponding longitudinal axis 59 of the connecting rod).

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A mechanism for controlling peak cylinder pressure in an internal combustion engine having a piston and a connecting rod drivingly connected with a crankshaft and reciprocably movable in a cylinder to form an expansible combustion chamber, the mechanism comprising:

an eccentric bearing rotatably mounting the connecting rod on one of a crankpin of the crankshaft and a wrist pin of the piston with a selected eccentricity of said connecting rod relative to the pin, the bearing being rotatable on the pin between a first angular position of connecting rod eccentricity wherein the piston is raised in the cylinder to maximize the compression ratio and a second angular position of connecting rod eccentricity wherein the piston is lowered in the cylinder to reduce the compression ratio; and a resilient member acting between the connecting rod and the bearing and urging the bearing toward the first position, the resilient member being yieldable in response to connecting rod forces acting on a lateral component of the connecting rod eccentricity to cause rotation of the bearing toward the second angular position during periods of peak cylinder pressure, and the resilient member acting to return the bearing to the first position upon reduction of the cylinder pressure, whereby limiting control of peak cylinder pressure is provided in the cylinder combustion chamber.

2. A mechanism as in claim 1 wherein the resilient element is a spring.

3. A mechanism as in claim 2 wherein the bearing includes a radial lever and the spring connects with the lever.

4. A mechanism as in claim 2 wherein the bearing includes a cam and the spring engages the cam.

5. A mechanism as in claim 1 wherein the bearing is between the crankpin and the connecting rod.

6. A mechanism as in claim 1 wherein, in the first angular position, said connecting rod eccentricity lies in a direction longitudinally upward from a lateral axis of the crankpin relative to the connecting rod.

7. A mechanism as in claim 1 wherein, in the second angular position, said connecting rod eccentricity lies in a direction longitudinally downward from a lateral axis of the crankpin relative to the connecting rod.

8. A mechanism as in claim 1 wherein, in the first angular position, said connecting rod eccentricity lies within a range of from about 75 degrees longitudinally upward to 0 degrees upward from a lateral axis of the crankpin relative to the connecting rod.

9. A mechanism as in claim 1 wherein, in the second angular position, said connecting rod eccentricity lies within a range of from about 0 degrees longitudinally downward to 75 degrees downward from a lateral axis of the crankpin relative to the connecting rod.

* * * * *